United States Patent [19]

Hewlitt et al.

[11] Patent Number: 4,506,645
[45] Date of Patent: Mar. 26, 1985

[54] LOAD CARRYING ASSEMBLY FOR AN INTERNAL COMBUSTION ENGINE

[75] Inventors: Robert W. Hewlitt; James H. Ruff, both of Cedar Falls; Aubrey E. Haight, Hudson, all of Iowa

[73] Assignee: Deere & Company, Moline, Ill.

[21] Appl. No.: 503,390

[22] Filed: Jun. 10, 1983

[51] Int. Cl.³ ............................................. F02M 61/14
[52] U.S. Cl. .................................... 123/470; 123/305; 123/193 H
[58] Field of Search ............... 123/302, 294, 315, 305, 123/193 H, 432, 467, 468, 469, 470

[56] References Cited

U.S. PATENT DOCUMENTS

| | | | |
|---|---|---|---|
| 2,777,431 | 1/1957 | Meurer | 123/470 |
| 3,824,971 | 7/1974 | Skatsche et al. | 123/302 |
| 4,066,213 | 1/1978 | Stampe | 123/470 |
| 4,213,564 | 7/1980 | Hulsing | 123/470 |

FOREIGN PATENT DOCUMENTS 2066895 7/1981 United Kingdom ................. 123/470

Primary Examiner—Craig R. Feinberg
Assistant Examiner—David A. Okonsky

[57] ABSTRACT

A load carrying assembly is disclosed for an internal combustion engine. The engine includes an engine block having a cylinder formed therein and having a cylinder head mounted onto the block. The cylinder head has a deck surface which closes off one end of the cylinder. A piston is reciprocally mounted in the cylinder and cooperates with the deck surface to form a combustion chamber. Air and combustion gases enter and exit the combustion chamber through intake and exhaust passages formed in the cylinder head and which terminate into intake and exhaust ports formed in the deck surface. The outer peripheries of the adjacent intake and exhaust ports form a bridge section therebetween having a maximum length which is less than twice the diameter of the larger of the intake and exhaust ports. Formed at least partially within the bridge section is a nozzle bore which also communicates with the combustion chamber. A sleeve having an enlarged portion on its outside diameter, is permanently fixed within the cylinder head such that one end will be aligned approximately adjacent to the deck surface of the cylinder head. The sleeve serves as a load carrying member which reduces the initiation of thermal cracks in the bridge section between the outer circumference of the nozzle bore and the outer peripheries of the intake and exhaust ports, respectively.

5 Claims, 6 Drawing Figures

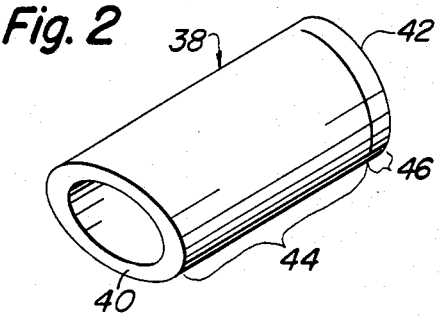
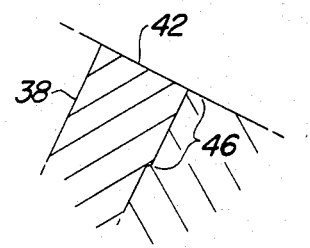
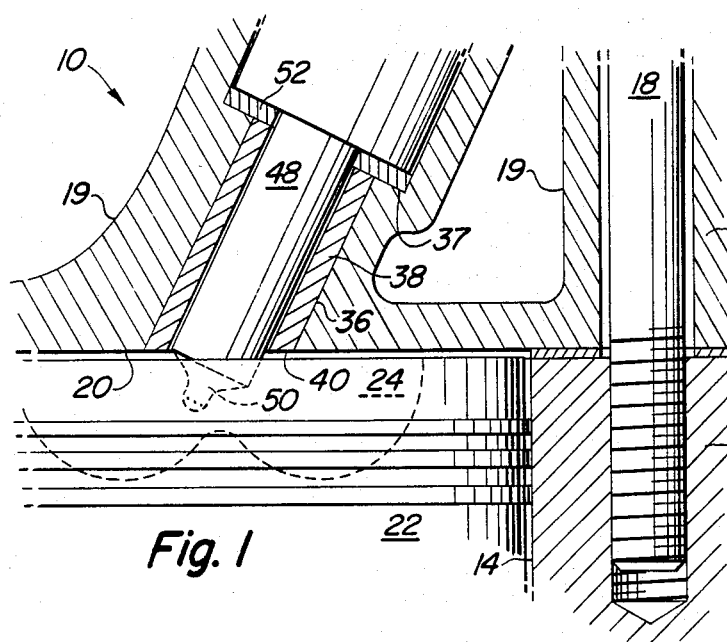
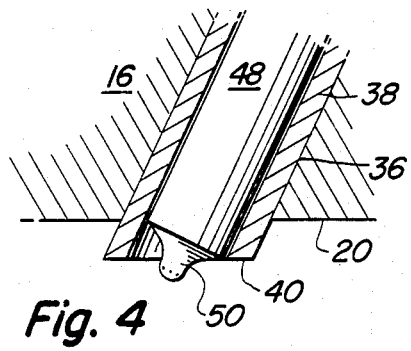
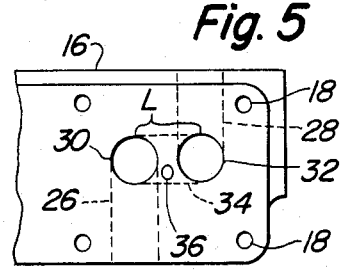
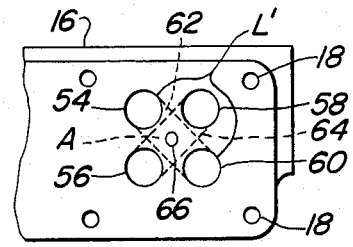

LOAD CARRYING ASSEMBLY FOR AN INTERNAL COMBUSTION ENGINE

FIELD OF THE INVENTION

This invention relates to a load carrying assembly for an internal combustion engine which reduces the initiation of thermal fatigue cracks in the deck region of a cylinder head.

BACKGROUND OF THE INVENTION

Direct injection diesel engines have a nozzle bore formed in the cylinder head for the insertion of a fuel injection nozzle. This nozzle bore is usually located between the intake and exhaust ports which are formed in the cylinder head. This region of the cylinder head is subjected to high temperature values as the gases within the combustion chamber are burned. These high temperature values, in conjunction with the small amount of material present between the nozzle bore and the intake and exhaust ports, results in the initiation and propagation of cracks due to the high stresses to which the material is subjected. Prior attempts to reduce cracking have included the use of an alloy iron having a high resistance to thermal fatigue and also the use of a small radius or chamfer which is machined about the nozzle bore. Although both of these alternatives have proved successful to a limited extent, they each do have a disadvantage. The alloy iron is very costly to use and the radius or chamfer does not lower the stress starting value far enough to satisfy the requirements of some engine manufacturers.

Now an improved load carrying assembly has been invented which reduces the initiation and propagation of thermal fatigue cracks in the deck region of a cylinder head.

SUMMARY OF THE INVENTION

Briefly, the present invention relates to a load carrying assembly for an internal combustion engine. The load carrying assembly includes an engine block having at least one cylinder formed therein and having a cylinder head mounted to the block. The cylinder head also has a deck surface which closes off one end of the cylinder and cooperates with a reciprocating piston within the cylinder to form a combustion chamber. For each cylinder, a set of intake and exhaust passages are formed in the cylinder head which route incoming air and exhaust gases to and from the respective cylinders. The passages terminate into adjacently aligned intake and exhaust ports formed in the deck surface. The outer peripheries of the adjacent ports form a bridge section therebetween having a maximum length which is less than twice the diameter of the larger of said intake and exhaust ports. The bridge section further has a fuel injection nozzle bore formed at least partially therein which communicates with the combustion chamber. This nozzle bore has a diameter less than the diameter of either of the intake or exhaust ports. Press-fitted into the nozzle bore is a hollow sleeve having a first end which is substantially flush with the deck surface of the cylinder head. The sleeve serves as a load carrying member which redistributes stress loads in the cylinder head material and therefore prevents or delays the start of thermal cracks in the bridge section between the outer periphery of the nozzle bore and the outer peripheries of the intake and exhaust ports, respectively.

The general object of this invention is to provide a load carrying assembly for an internal combustion engine. A more specific object of this invention is to provide a load carrying assembly for an internal combustion engine which utilizes a sleeve constructed of a material which is stiffer than the material from which the cylinder head is constructed such that the sleeve reduces the compressive load exerted on the cylinder head and thereby reduces the tendency of the cylinder head to yield.

Another object of this invention is to provide a low cost load carrying assembly for an internal combustion engine which is capable of reducing the initiation of thermal cracks between a nozzle bore and adjacent intake and exhaust passages.

Still another object of this invention is to provide a load carrying assembly for an internal combustion engine which uses a sleeve having a higher coefficient of thermal expansion than that of the material from which the cylinder head is constructed.

A further object of this invention is to provide a load carrying assembly for an internal combustion engine which utilizes a sleeve constructed about a nozzle bore formed in the cylinder head, the sleeve permits stress loads occurring during engine operation to be concentrated on its periphery and therefore redistributes the stress acting on the material from which the cylinder head is constructed Other objects and advantages of the present invention will become more apparent to those skilled in the art in view of the following description and the accompanying drawings.

BRIEF DESCRIPTION OF THE DRAWINGS

FIG. 1 is a partial cross-sectional view of a cylinder head assembly showing a sleeve press-fitted into a nozzle bore.

FIG. 2 is a perspective view of the sleeve shown in FIG. 1.

FIG. 3 is an enlargement of one end of the sleeve shown in FIG. 1 depicting a stepped formation on the outer periphery thereof.

FIG. 4 is a partial cross-sectional view of the sleeve fitted into a nozzle bore and having its lower end projecting into a combustion chamber.

FIG. 5 is a schematic bottom view of a cylinder head showing adjacent intake and exhaust ports with a bridge section therebetween and having a fuel injection nozzle bore formed in the bridge section.

FIG. 6 is a schematic bottom view of a cylinder head having an alternative port arrangement wherein a pair of intake ports and a pair of exhaust ports are formed therein with a fuel injection nozzle bore located in the center thereof.

DETAILED DESCRIPTION OF THE PREFERRED EMBODIMENTS

Referring to FIG. 1, a load carrying assembly 10 is shown for an internal combustion engine. The engine includes an engine block 12 having at least one cylinder 14 formed therein. A cylinder head 16 is mounted to the block 12 by a plurality of bolts 18 and has at least one cooling chamber 19 formed therein and a deck surface 20 which closes off one end of the cylinder 14. A piston 22 is reciprocally mounted in the cylinder 14 and cooperates with the deck surface 20 to form a combustion chamber 24.

Formed within the cylinder head 16 and communicating with the combustion chamber 24 are intake and exhaust passages 26 and 28 which terminate into intake and exhaust ports 30 and 32 respectively, see FIG. 5. Located between the outer peripheries of the intake and exhaust ports 30 and 32 is a bridge section 34 which has a maximum length L which is less than twice the diameter of the larger of said intake and exhaust ports 30 and 32. The cylinder head 16 also has a fuel injection nozzle bore 36 formed therein which communicates with the combustion chamber 24 and which is at least partially located within the bridge section 34. The nozzle bore 36 has a smaller diameter than either of the intake or exhaust ports 30 and 32 and preferably has a stepped configuration as shown in FIG. 1 wherein at least one step 37 is present.

Press-fitted into the nozzle bore 36 is a hollow sleeve 38, which has a first end 40 and a second end 42. Located between the first and second ends 40 and 42 is a first section 44 and a second section 46. The first section 44 includes about 70 to 90 percent of the overall length of the sleeve 38 while the second section 46 makes up the remaining 10 to 30 percent. The second section 46 has a slightly larger outside diameter than the first section 44, see FIG. 3. The sleeve 38 is positioned within the lowermost portion of the nozzle bore 36 such that the first end 40 is either aligned flush with the deck surface 20 as is shown in FIG. 1, or extends beyond the deck surface 20 into the combustion chamber 24 as is shown in FIG. 4. An interference fit formed between the outer periphery of the sleeve 38 and the smallest inner diameter of the bore 36 is such that the sleeve 38 is slightly deformed. In addition, the enlarged second section 46 of the sleeve 38 creates a tighter fit at the second end 42 of the sleeve 38 such as to prevent the sleeve 38 from sliding downwards into the combustion chamber 24. If such movement was permitted, the first end 40 of the sleeve 38 could possibly contact the top of the piston 22 and this would be unacceptable to engine operation.

The sleeve 38 is constructed of a material having a higher coefficient of thermal expansion than the material from which the cylinder head 16 is constructed. The sleeve 38 should also have a greater stiffness than the material out of which the cylinder head is constructed so that the sleeve 38 can reduce the compressive load exerted on the cylinder head and thereby reduce the tendency of the cylinder head to yield.

Positioned within the nozzle bore 36 and extending through the sleeve 38 is a fuel injector 48 which has a nozzle tip 50 extending into the combustion chamber 24. A washer 52 can be employed at the second end 42 of the sleeve 38 to prevent the outward movement of combustion gases from the combustion chamber 24. The washer 52 acts as a seal between the sleeve 38 and the fuel injector 48.

Referring again to FIG. 5, one will notice that there is very little material present between the outer peripheries of the intake and exhaust ports 30 and 32 and the outer circumference of the nozzle bore 36. These two narrow bands of material are very sensitive to cracking during engine operation. Laboratory tests have shown that when the combustion temperatures of the engine reach approximately 1900 degrees Celsius, the temperature of the deck surface 20 of the cylinder head 16 can reach approximately 420 degrees Celsius. These high temperature values cause the material from which the cylinder head 16 is constructed to yield in compression.

As the cylinder head 16 is allowed to cool, the material tends to fail in tension and cracks occur starting from the outer periphery of the nozzle bore 36. These cracks are due to low cycle thermal loading of the engine and they can propagate outward towards the outer peripheries of the intake and exhaust ports 30 and 32, respectively, or toward the cooling chamber 19. The presence of such cracks can provide a conduit through which combustion gases can enter the cooling chamber 19 as well as permitting coolant to get into the combustion chamber 24. Both occurrences are detrimental to the effective operation of the engine.

The insertion of the low cost sleeve 38 into the cylinder head 16 has proven to reduce or delay the formation of such stress cracks by approximately 40 percent when used in a cast iron cylinder head 16. The majority of the load is carried by the first section 44 of the sleeve 38, especially the lower region adjacent to the deck surface 20. By reducing the loading in this section, one is able to prevent, and at the worst, delay the propagation of cracks in the bridge section 34.

Turning now to FIG. 6, a cylinder head 16 is shown having an alternative port arrangement wherein a pair of intake ports 54 and 56 and an adjacently aligned pair of exhaust ports 58 and 60 are utilized. Such an arrangement is normally used on diesel engines wherein it is necessary to improve the efficiency of the engine by allowing the air flowing into the cylinder 14 and the combustion gases leaving the cylinder 14 to occur at a faster rate. In this arrangement, the ports 54–60 are in a square pattern and the outer peripheries of each pair of diagonally aligned ports form a pair of bridge sections 62 and 64 therebetween. In this formation, each bridge section 62 and 64 has a maximum length L' which is less than three times the diameter of the larger of the diagonally aligned intake and exhaust ports 54 and 60 or 56 and 58, respectively. The overlapping area of the bridge section 62 and 64 will form an area (A) which has a nozzle bore 66 formed at least partially therein. The diameter of the nozzle bore 66 is less than the diameter of any one of the ports 54 through 60. As stated above, the sleeve 38 would be press-fitted into the nozzle bore 66 and would act as a load carrying member to reduce the initiation of thermal cracks in the overlapping area (A) of the bridge sections 62 and 64.

While the invention has been described in conjunction with several specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A load carrying assembly for an internal combustion engine comprising:
   (a) an engine block having a cylinder formed therein;
   (b) a cylinder head mounted to said block and having a deck surface which closes off one end of said cylinder;
   (c) a piston reciprocally mounted in said cylinder and cooperating with said deck surface to form a combustion chamber;
   (d) a pair of intake and exhaust passages formed in said cylinder head, said passages terminating into adjacent intake and exhaust ports formed in said deck surface which communicate with said combustion chamber;

(e) a bridge section formed between the outer peripheries of said adjacent ports having a maximum length which is less than twice the diameter of the larger of said intake and exhaust ports, said bridge section further having a stepped nozzle bore formed at least partially therein and communicating with said combustion chambers, said stepped nozzle bore having at least one bore with a diameter less than the diameter of either of said respective ports; and (f) a hollow cylindrical sleeve having first and second outer peripheral sections located between first and second ends, said second section having a slightly larger cross-sectional area than said first section, said sleeve being press fitted into a portion of said stepped bore with said first end positioned approximate flush with said deck surface and said second end being positioned approximate a step of said stepped bore, said sleeve being constructed of a material having a higher coefficient of thermal expansion and a greater stiffness than the material from which said cylinder head is constructed so as to be capable of serving as a load carrying member to reduce stress buildup within said bridge section and to reduce the initiation of thermal fatigue cracks in said bridge section.

2. A load carrying assembly for an internal combustion engine comprising:

(a) an engine block having a cylinder formed therein;

(b) a cylinder head mounted to said block and having a deck surface which closes off one end of said cylinder;

(c) a piston reciprocally mounted in said cylinder and cooperating with said deck surface to form a combustion chamber;

(d) a pair of intake passages and a pair of exhaust passages formed in said cylinder head, said passages terminating into intake and exhaust ports formed in said deck surface and being arranged in a square pattern and communicating with said combustion chamber;

(e) a pair of bridge sections formed between the outer peripheries of diagonally aligned intake and exhaust ports having a maximum length which is less than three times the diameter of the larger of said diagonally aligned intake and exhaust ports, the overlapping area of said pair of bridge sections having a fuel injector nozzle bore formed at least partially therein which communicates with said combustion chamber, said nozzle bore having a diameter less than the diameter of any one of said adjacent ports; and (f) a hollow sleeve press fitted into said nozzle bore, said sleeve having a first end which is approximately flush with said deck surface and being constructed of a material having a higher coefficient of thermal expansion and a greater stiffness than the material from which said cylinder head is constructed, said sleeve serving as a load carrying member to reduce the initiation of thermal fatigue cracks in said overlapping area of said pair of bridge sections.

3. A load carrying assembly for an internal combustion engine comprising:

(a) an engine block having a cylinder formed therein;

(b) a cylinder head mounted to said block and having a deck surface which closes off one end of said cylinder;

(c) a piston reciprocally mounted in said cylinder and cooperating with said deck surface to form a combustion chamber;

(d) an intake and an exhaust passage formed in said cylinder head, said passages terminating into adjacent intake and exhaust ports formed in said deck surface which communicate with said combustion chamber;

(e) a bridge section formed between the outer peripheries of said adjacent ports having a maximum length which is less than twice the diameter of the larger of said intake and exhaust ports, said bridge section further having a fuel injector nozzle bore formed at least partially therein and communicating with said combustion chamber, said nozzle bore having a diameter less than the diameter of either of said respective ports; and (f) a hollow sleeve having a constant inside diameter and a stepped outside diameter press-fitted into said nozzle bore, said sleeve having a first end which projects beyond said deck surface and into said respective combustion chamber and being constructed of a material having a higher coefficient of thermal expansion and a greater stiffness than the material from which said cylinder head is constructed, said sleeve serving as a load carrying member to reduce the initiation of thermal fatigue cracks in said bridge section.

4. A load carrying assembly for an internal combustion engine comprising:

(a) an engine block having a cylinder formed therein;

(b) a cylinder head mounted to said block and having a deck surface which closes off one end of said cylinder;

(c) a piston reciprocally mounted in said cylinder and cooperating with said deck surface to form a combustion chamber;

(d) an intake and an exhaust passage formed in said cylinder head, said passages terminating into adjacent intake and exhaust ports formed in said deck surface which communicate with said combustion chamber;

(e) a bridge section formed between the outer peripheries of said adjacent ports having a maximum length which is less than twice the diameter of the larger of said intake and exhaust ports, said bridge section further having a fuel injector nozzle bore formed at least partially therein and communicating with said combustion chamber, said nozzle bore having a diameter less than the diameter of either of said respective ports; and (f) a hollow sleeve press fitted into said nozzle bore, said sleeve having a first end which is approximately flush with said deck surface and being constructed of a material having a higher coefficient of thermal expansion and a greater stiffness than the material from which said cylinder head is constructed, said sleeve serving as a load carrying member to reduce the initiation of thermal fatigue cracks in said bridge section.

5. The load carrying assembly of claim 4 wherein said sleeve has first and second sections, said first section extending from said first end about 70 to 90 percent of the overall sleeve length and said second section having an enlarged circumference, said enlarged circumference creating a greater interference fit with a portion of said nozzle bore which facilitates affixing said sleeve in said nozzle bore.

* * * * *